Feb. 29, 1944.     E. C. NEAL     2,342,959
HYDRAULIC MECHANISM
Filed Aug. 20, 1941     3 Sheets-Sheet 1
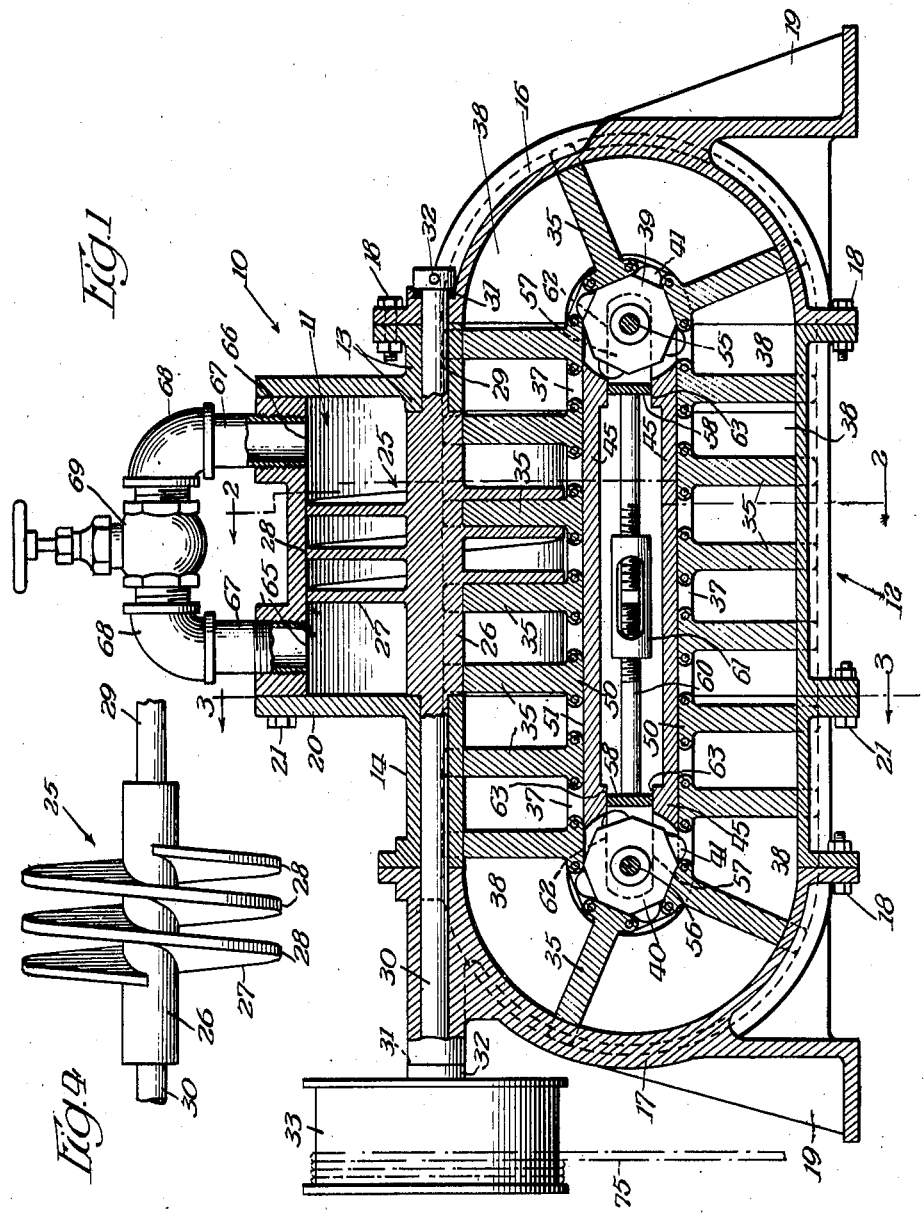
Inventor
Ernest C. Neal
By Spencer, Marzall, Johnston r Cook
Attys Feb. 29, 1944.  E. C. NEAL  2,342,959
HYDRAULIC MECHANISM
Filed Aug. 20, 1941  3 Sheets-Sheet 2
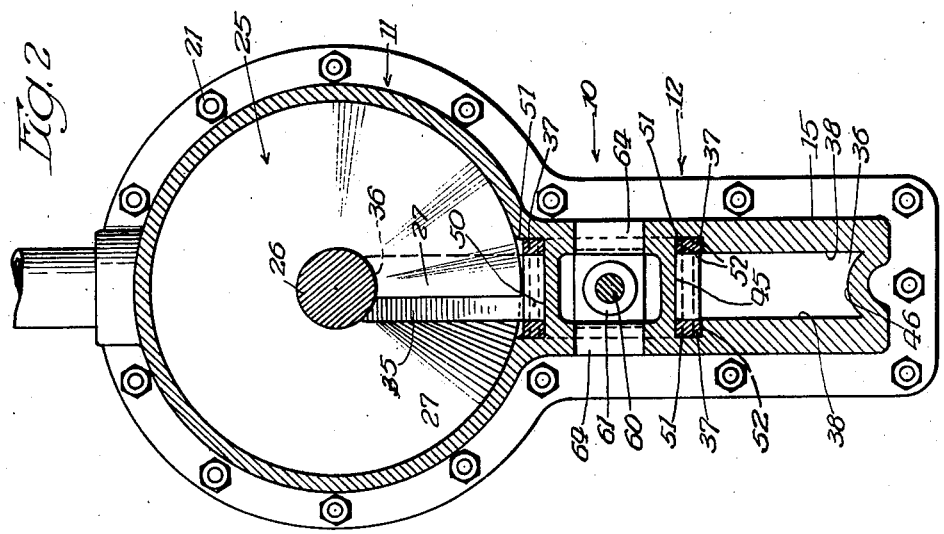
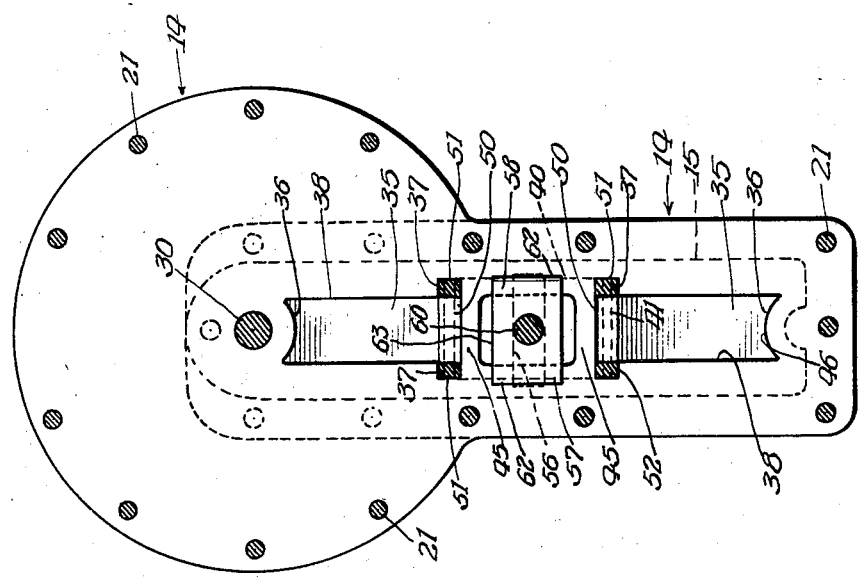
Inventor
Ernest. C. Neal
By Spencer, Marzall, Johnston & Cook Attys Feb. 29, 1944.  E. C. NEAL  2,342,959
HYDRAULIC MECHANISM
Filed Aug. 20, 1941  3 Sheets-Sheet 3

Inventor
Ernest C. Neal
By Spencer, Margell, Johnston + Cook
Attys.

Patented Feb. 29, 1944

2,342,959

UNITED STATES PATENT OFFICE 2,342,959

HYDRAULIC MECHANISM

Ernest C. Neal, Chicago, Ill., assignor, by direct and mesne assignments, to John A. Marzall, Chicago, Ill., as trustee Application August 20, 1941, Serial No. 407,596

10 Claims. (Cl. 188—90)

This invention relates to hydraulic mechanism and is a continuation-in-part of the invention disclosed in the application of Ernest C. Neal, Serial No. 316,533, filed January 31, 1940, now abandoned.

An important object of the invention is the provision of a new and novel hydraulic mechanism which is accurate and positive in operation and in which a positive and definite action is created between the fluid or liquid in a casing and a worm or screw.

A further important object is the provision of improved hydraulic mechanism which has means whereby the fluid or liquid action in the casing positively and definitely creates a positive action on the worm or screw when a valve is closed but allows freedom of operation when the valve is open.

Another important object is the provision of improved hydraulic mechanism which is susceptible to various uses because of the specific arrangement of parts and includes a worm or screw having a positive fluid seal whereby the device may be used as a water lift, a brake or other uses.

A further object of the invention lies in the provision of an improved element and arrangement of parts whereby fluid is positively moved by the operation of a rotatively mounted screw and the fluid is caused to move while in the casing at a relatively low speed as compared to the faster operation of the rotating screw so as to permit the fluid or liquid to be positively acted upon by the screw, and eliminate churning of the fluid, thereby causing the fluid to perform fully the function intended.

A further object of the invention is the provision of improved hydraulic mechanism having a rotatable worm or screw operating in a cylinder and having an element so arranged between the lands of the screw and the casing as to positively and definitely force the liquid in a predetermined direction upon rotation of the screw in a predetermined direction and to prevent reverse flow of the liquid or fluid during such rotation.

A still further object is the provision of such hydraulic mechanism which is substantially sealed against leakage past the worm or screw and in which the body of fluid moved by the worm or screw is much greater than the volume circulated by the element arranged between the lands of the screw whereby movement of the screw must necessarily advance the fluid to an external outlet during continued rotation of the screw.

The accompanying drawings illustrate selected embodiments of the invention and views therein are as follows:

Fig. 1 is a longitudinal sectional view through one embodiment of the improved hydraulic mechanism or device;

Fig. 2 is a sectional view taken at right angles to Fig. 1 on the line 2—2 thereof;

Fig. 3 is a sectional view, similar to Fig. 2, taken on the line 3—3 of Fig. 1;

Fig. 4 is a view of the fluid operating worm or screw; and

Figure 5:
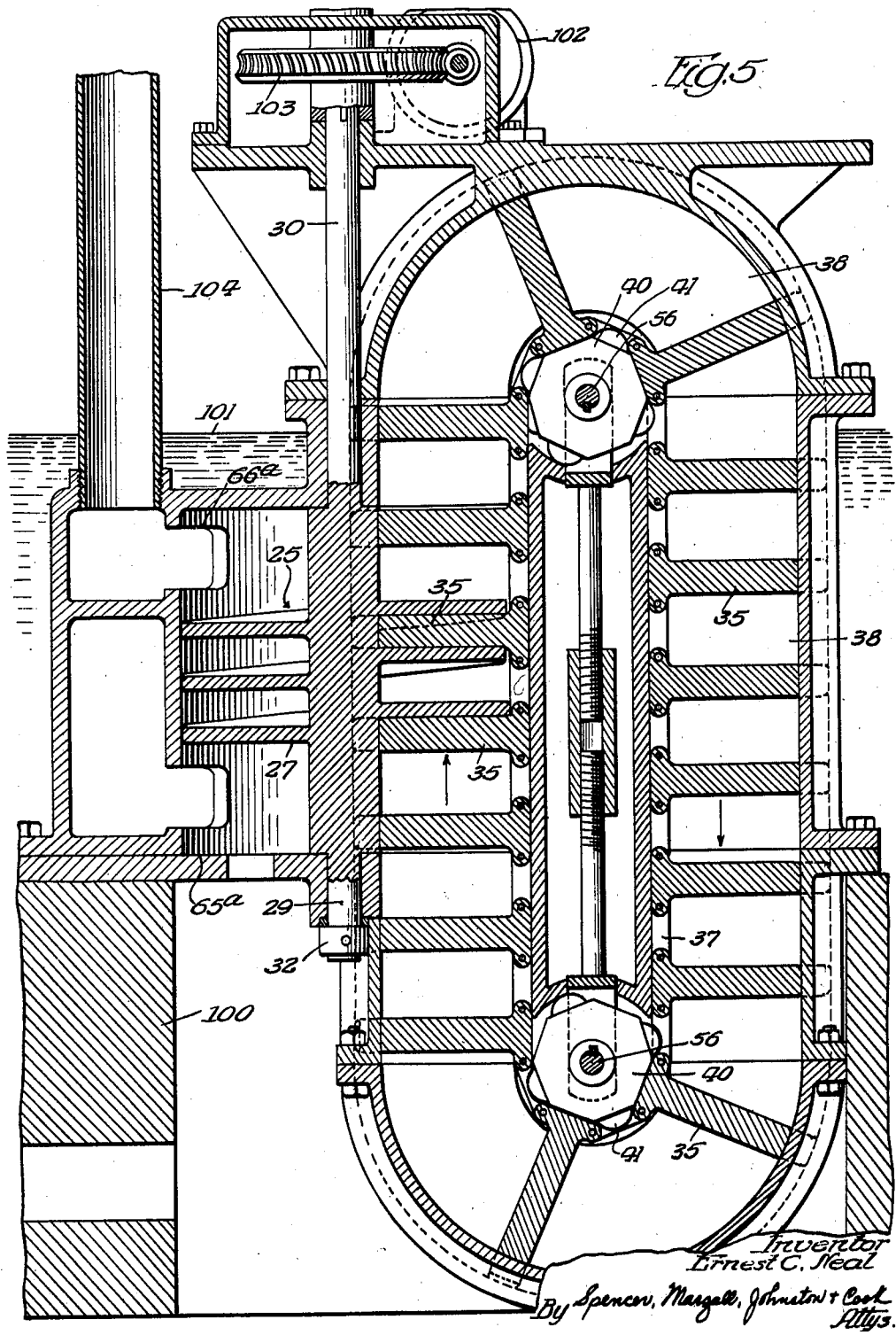
Fig. 5 is a longitudinal sectional view similar to Fig. 1 of another embodiment of the invention.

Referring to the drawings, and more particularly to Figs. 1 through 4 thereof, the hydraulic mechanism is designated generally by the reference numeral 10 and comprises a casing having a relatively cylindrical portion 11 and a generally rectangular portion 12. The portion 12 extends longitudinally outwardly beyond the ends of the cylindrical portion 11 as shown at 13 and 14 in Fig. 1 and also extends radially outwardly from the portion 11 as indicated at 15 in Figs. 2 and 3. In the embodiment of Figs. 1 to 3, the casing portion 12 extends downwardly from the cylindrical portion 11 and provides a supporting base for the mechanism. End plates 16 and 17 of generally semi-cylindrical shape close the ends of the casing portion 12 and are removably fastened to the portion 12 in fluid sealed relationship therewith by suitable means such as the cap screws or bolts 18. Legs 19 secured to the end plates 16 and 17 provide a supporting pedestal or base for the mechanism as above described.

To provide for readily assembling the device and also to permit ready access into the interior of the mechanism for cleaning, repairs, or the like, the main body of the casing is preferably split at the line 3—3 of Fig. 1 to provide two separable parts or sections. Thus the entire left end of the casing body as seen in Fig. 1, and comprising the longitudinally extending portion 14 of the part 12 and the end wall 20 for the cylindrical casing portion 11, can be detached and removed from the remainder of the casing body. The two casing sections are removably fastened together in fluid sealed relationship by means of cap screws or bolts 21 which extend through the end wall 20 and through a pair of cooperating flanges provided on the two sections around the downwardly extending portion 12.

The cylindrical portion 11 provides a chamber for receiving a rotatable element in the form of a screw or worm 25. As best shown in Fig. 4, the screw or worm 25 comprises a hub or body portion 26 and a continuous thread or spiral rib 27 which extends spirally about the body portion for at least two turns near the middle thereof. The external or peripheral surfaces 28 of the spiral 27 are relatively flat as shown to fit snugly but freely against the inner cylindrical wall of the cylindrical portion 11. The tolerance or fit of the spiral 27 with respect to the chamber 11 is such as to prevent the leakage of fluid around the flattened ends of the spiral.

The screw or worm 25 is rotatably mounted in the casing portion 11 by means of a pair of shafts or pintles 29 and 30 which extend outwardly from opposite ends of the body portion 26 and are received within openings provided in the casing portions 13 and 14 and the end caps 16 and 17. The shafts 29 and 30 are rotatably mounted in suitable bearings provided in these portions of the casing. Suitable seals 31, such as a fluid seal known commercially in the art as the "Rotary Seal," are provided at each end of the casing to prevent escape of fluid axially along the shafts 29 and 30. Thrust collars 32 are provided on the shafts 29 and 30 at each end of the casing, and a suitable means such as a pulley 33 is attached to an outwardly extending end of the shaft 30 to provide for effecting rotation of the screw or worm 25.

In accordance with the present invention a means is provided which assures a positive and definite reaction between the screw or worm 25 and a fluid contained within the casing, and which prevents any reverse flow of the fluid through the screw or worm, or around the same within the mechanism. This means comprises a plurality of lugs or upstanding members 35 which are adapted to be closely received between the lands of the worm 25 and also within the casing portion 12. As shown in Figs. 1 and 2, the members 35 have a width such that they fit directly between the lands of the screw or worm 25 and have such height including a curved portion 36 as to fit around the body portion 26 of the worm. Escape of fluid between the members 35 and the lands of the worm 25, and reverse flow of fluid around the spiral of the worm is thus substantially prevented.

The members 35 are operatively connected together by pivotally connected links 37 forming in effect an endless chain which is advanced by rotation of the screw or worm 25. The casing portion 12 provides a passageway or channel 38 through which the endless chain comprising the members 35 moves. The chain revolves around sprocket members 39 and 40 which are provided with projections 41 received within the links 37 of the chain.

A hollow wall or partition 45 extends longitudinally of the casing between the side walls of the casing portion 12 and provides a separation wall between the casing portions 11 and 12. The partition 45 together with the casing portions 13 and 14, the end caps 16 and 17, and the bottom wall of the casing part 12 provide the passageway or channel 38 for movement of the chain. As best shown in Figs. 2 and 3, the size and shape of the passage 38 is such as to exactly receive the members 35 with a sliding fit therein, the sides and ends of the members 35 having sliding contact with the sides and ends of the channel, and the ends of the channel being curved as indicated at 46 to fit the curved ends 36 of the members 35. The tolerance or fit of the members 35 within the passage 38 is such as to prevent leakage of fluid around the edges of the members, and the length of the passage is such as to contain a relatively large number of members 35 therein to thereby positively restrain leakage of fluid past the members even under very great pressures.

To further prevent leakage of fluid around the members 35, both within the lands of the worm 25 and within the passage 38, a means is provided for positively maintaining the members in upright position so as to be closely received against the worm and the walls of the passage. Referring to Figs. 1 and 2, the upstanding lugs or members 35 are provided with feet or base portions 50 that have flat undersides of substantial area. These feet or base portions together with the connection links 37 are adapted to slide within flat guides or grooves 51 provided in the casing portions 11 and 12 along the upper and lower reaches of the partition or wall 45. Since the feet 50 have appreciable area, the flat grooves 51 together with the close fit of the several parts maintain the members 35 in proper upright position. This positioning is further maintained within the passage 38 at the underside of the wall 45 by lips or flanges 52 which overlie the chain links 37 and provide recesses within which the chain travels. The lugs 35 are thus maintained in positive sealed relationship with both the worm 25 and the walls of channel 38.

The sprockets 39 and 40 are mounted on shafts 55 and 56 which are rotatably mounted in bearings 57 provided adjacent the side walls of the casing portion 12 at the ends of the partition 45. The mounting for the sprockets 39 and 40 is preferably such that the distance between the shafts 55 and 56 may be varied to take up any wear at the ends of the lugs or members 35 and thus maintain the members always in fluid sealed contact with the end walls of the passage 38. For this purpose, the bearings 57 comprise U-shaped yoke members 58 having their free legs engaged about the shafts 55 and 56 and having inwardly extending portions 60 received between the parallel walls or partitions 45. The portions 60 are provided with right and left handed screw threaded portions, respectively, which are engaged by a threaded sleeve 61. Thus by rotating the sleeve 61 the distance between the shafts 55 and 56 may be varied. Suitable grooves 62 are provided in the casing portion 12 and the end caps 16 and 17 to permit sliding movement of yoke 58 and adjustment of the shafts 55 and 56. The bearing yokes 58 are also slidably supported on shoulders 63 provided on the partition members 45. A suitable opening 64 is provided in the side walls of casing portion 12 between the partition members 45 to permit adjustment of the sleeve 61.

The embodiment of the invention shown in Figs. 1 to 3 of the drawings is adapted to be used as a hydraulic brake. To accomplish this purpose ports 65 and 66 are provided in the cylindrical chamber 11 adjacent opposite ends thereof and outside of the lands or spiral ribs 27 of the worm 25. Pipes 67 are threaded into the ports 65 and 66 and are provided with elbows 68 having connection with a valve 69. The entire casing including the bypass afforded by the pipes 67 and the valve 69 is filled with a desired fluid such as oil, preferably under some pressure. When the valve 69 is open the worm 25 is free to operate under turning action of the pulley 33 and circulates the fluid through the above mentioned bypass. When the valve 69 is closed, however, all fluid flow except such as can pass through the passageway or channel 38 is stopped.

As clearly indicated in Fig. 2 taken in connection with Fig. 1, the amount or volume of fluid that is advanced with each turn of the worm 25 is many times that which can pass through the channel 38 under control of the members 35. Since the construction of the parts is such that there is no substantial leakage past the members 35 within the passage 38, a large braking force is brought against the worm 25 when the valve 69 is closed and the worm is brought to a positive stop.

The invention as thus far described is capable of any number of uses, such for example, as a hydraulic brake for any desired hoisting or elevator apparatus. When used in such connection the cable 75 which extends around the pulley 33 is attached to the hoist or elevator, and suitable means connected with the control apparatus provides for operation of the valve 69.

The invention is not limited to a hydraulic brake, however, and an embodiment of the invention in which the mechanism serves as a fluid lift is disclosed in Fig. 5. In this figure, like reference numerals designate like parts, and the operation is generally similar to that previously described. Here the mechanism is adapted to be vertically arranged, and is partially positioned within a reservoir or sump 100. The water level 101 preferably extends above the topmost lug or member 35 which engages the spiral 27 of the worm 25. A motor 102 operating through reduction gearing 103 connected to shaft 30 provides for rotating the worm 25. The inlet port 65a is positioned below the water line. The outlet port 66a here communicates with a fluid lift pipe 104. When the worm 25 is rotated by the motor 102 a great lifting power is exerted on the fluid contained within the casing since the passageway 38 is sealed against leakage around the members 35.

Preferably, in accordance with the present invention, a lug or member 35 is not received between each land or spiral rib 27 of the worm 25. As shown in Figs. 1 and 5 the members 35 are so arranged that one enters the lands 27 of the worm 25 only as another is leaving. This assures positive action of the members 35 with the greatest efficiency.

The chain including the lugs 35 and the connecting links 37 is continuously operated whenever the worm 25 is rotated. The oil or other liquid in the casing is thus agitated to a certain extent and tends to overcome liquid seepage or slippage around the screw 25. Moreover, there is always a lug 35 in the land of the screw and therefore any liquid in front of the lug must be forced forwardly when the screw is rotated. When operating as a brake and the valve 69 is closed, a terrific braking action is effected because there is no possibility of the screw slipping and merely churning the liquid or the fluid escaping around the lugs 35 in passageway 38. The construction, therefore, by the inclusion of a sealed element adapted to be received between the raised ribs and in the lands definitely provides a leak-proof, churn-proof, non-slipping or non-seeping brake or lift whose action is positive and definite.

Changes may be made in the form, construction and arrangement of parts without departing from the spirit of the invention or sacrificing any of its advantages, and the right is hereby reserved to make all such changes as fairly fall within the scope of the following claims.

The invention is hereby claimed as follows:

1. A hydraulic mechanism of the character described comprising a casing, a worm closely received in said casing, a chain-like member rotatably mounted in said casing and having elements closely received between lands of said worm to obstruct circulation of fluid around said lands, a channel in said casing for movably receiving said chain-like member and said elements, each of said elements having sides and an outer end in sliding relation with said channel, the said elements and the said channel being of such conformation that the sides and outer end of each of said elements have sliding contact with a corresponding portion of the channel around substantially its entire length to substantially seal the channel against leakage of fluid through the channel and around edges of said elements, said worm providing for advancing a quantity of fluid much greater than can pass through said channel ahead of said elements, and guide means in said casing cooperating with the inner ends and base portions of said elements for pressing the outer ends of the elements into sliding contact with said channel and maintaining the elements in positive upstanding position during passage between the lands of said worm and through said channel.

2. A hydraulic mechanism of the character described comprising a casing, a worm closely received in said casing, a chain-like member rotatably mounted in said casing and having elements closely received between lands of said worm to obstruct circulation of fluid around said lands, an elongated channel in said casing for movably receiving said chain-like member and a relatively large number of said elements, each of said elements having sides and an outer end in sliding relation with said channel, the said elements and the said channel being of such conformation that the sides and outer end of each of said elements have sliding contact with a corresponding portion of the channel around substantially its entire length to substantially seal the channel against leakage of fluid through the channel and around edges of said elements, said worm providing for advancing a quantity of fluid much greater than can pass through said channel ahead of said elements, and guide means in said casing cooperating with the inner ends and base portions of said elements for pressing the outer ends of the elements into sliding contact with said channel and maintaining the elements in positive upstanding position during passage between the lands of said worm and through said channel.

3. A hydraulic mechanism comprising a casing, a shaft rotatably mounted in the casing and having a spirally arranged rib forming a worm, a chain-like member rotatably mounted in said casing and having upstanding elements closely received between lands of said worm to obstruct circulation of fluid around said lands, each of said upstanding elements having sides, and an outer end provided with concave portions adapted to fit said shaft between said lands, and an elongated channel in said casing for movably receiving said chain-like member and a relatively large number of said upstanding elements, said channel having a convex wall adapted to fit said concave portions of said upstanding elements, said elements and said channel being so arranged and of such conformation that the sides and outer end of each of said elements have sliding contact with corresponding portions of the channel around substantially the entire length thereof to substantially seal the channel against leakage of fluid through the channel and around edges of said elements.

4. A hydraulic mechanism comprising a casing, a shaft rotatably mounted in the casing and having a spirally arranged rib forming a worm, a chain-like member rotatably mounted in said casing and having upstanding elements closely received between lands of said worm to obstruct circulation of fluid around said lands, partition means positioned in said casing, said casing and said partition means providing a channel for movably receiving said chain-like member and said upstanding elements, said elements having sides and an outer end in sliding contact with corresponding portions of said channel, said elements and said channel being so arranged and of such conformation that the sides and outer end of each of said elements have sliding contact with corresponding portions of said channel around substantially its entire length, said upstanding elements having base portions of substantial flat area, and guide means in said casing along the length of said partition for receiving said base portions and maintaining said elements in positive upstanding position during passage between the lands of said worm and through said channel.

5. A hydraulic mechanism comprising a casing, a shaft rotatably mounted in the casing and having a spirally arranged rib forming a worm, a chain-like member rotatably mounted in said casing and having upstanding elements closely received between lands of said worm to obstruct circulation of fluid around said lands, partition means positioned in said casing, said casing and said partition means providing a channel for movably receiving said chain-like member and said upstanding elements, said elements having sides and an outer end in sliding contact with corresponding portions of said channel, said elements and said channel being so arranged and of such conformation that the sides and outer end of each of said elements have sliding contact with corresponding portions of said channel around substantially its entire length, said upstanding elements having base portions of substantial flat area, and elongated grooves in said casing along the length of said partition for receiving said base portions and maintaining said elements in positive upstanding position during passage between the lands of said worm and through said channel.

6. A hydraulic mechanism comprising a casing, a worm mounted in said casing, a plurality of upstanding elements adapted to be received between lands of said worm to obstruct circulation of fluid around said lands, a plurality of links pivotally connecting said elements to provide an endless chain-like member, partition means positioned in said casing, said casing and said partition means providing a channel for movably receiving said chain-like member and said upstanding elements, said elements having sides and an outer end in sliding contact with corresponding portions of said channel, said elements and said channel being so arranged and of such conformation that the sides and outer end of each of said elements have sliding contact with corresponding portions of said channel around substantially its entire length, said upstanding elements having base portions of substantial flat area, and elongated grooves in said casing along the length of said partition for receiving said base portions and maintaining said elements in positive upstanding position during passage between the lands of said worm and through said channel, at least one of said grooves being provided with shoulder portions providing a recess for receiving said chain-like member adjacent said base portions of the upstanding elements.

7. A hydraulic mechanism comprising a casing, a worm mounted in said casing, a plurality of upstanding elements adapted to be received between lands of said worm to obstruct circulation of fluid around said lands, a plurality of links pivotally connecting said elements to provide an endless chain-like member, partition means positioned in said casing, said casing and said partition means providing a channel for movably receiving said chain-like member and said upstanding elements, said elements having sides and an outer end in sliding contact with corresponding portions of said channel, said elements and said channel being so arranged and of such conformation that the sides and outer end of each of said elements have sliding contact with corresponding portions of said channel around substantially its entire length, said upstanding elements having base portions of substantial flat area, and elongated grooves in said casing along the length of said partition for receiving said base portions and maintaining said elements in positive upstanding position during passage between the lands of said worm and through said channel, at least one of said grooves being provided with shoulder portions adapted to overlie said links during passage of the chain-like member through said channel to assist in maintaining said elements in upstanding position.

8. Hydraulic mechanism comprising a casing adapted to contain a fluid, a shaft rotatably mounted in the casing and having outstanding ribs spirally arranged about the shaft intermediate its ends and forming a worm, a plurality of elements adapted for successive engagement with the worm and in a land thereof so as to be translated by the worm and cause all fluid between ribs to be forced in a predetermined direction upon rotation of the shaft, a by-pass connecting opposite ends of the casing, a valve operable in the by-pass, links arranged between the elements and pivotally connected thereto providing an endless chain, members revolubly mounted in the casing for supporting the chain, and means between said members for increasing or decreasing the space between the members.

9. Hydraulic mechanism comprising a casing having an upper enlarged portion and a lower narrow portion, a worm rotatively mounted in the upper enlarged part of the casing, spaced apart rotatable members operatively mounted in the lower end of the casing, a chain member trained over said rotatable members, means for adjusting the rotatable members toward and away from each other, lugs on the chain adapted to be received in the lands of the worm whereby the chain is propelled upon rotation of the worm, said lugs being adapted during movement thereof to have relatively close contact with the bottom of the lower part of the casing, said lugs being substantially as thick as the interior width of the lower part of the casing so as to make relatively close contact with the side walls of the casing, a wall of the lower part of the casing being removable, a pipe line mounted in the upper part of the casing on each side of the worm, and a valve interposed in said pipe line.

10. Hydraulic mechanism comprising a casing, a worm rotatably mounted in said casing, a chain-like member having a plurality of elements adapted for successive engagement with the worm and in a land thereof so as to be translated by the worm and cause all fluid between the worm lands to be forced in a predetermined direction upon rotation of the worm, a channel in said casing for movably receiving said chain-like member and said elements, said elements having sides and an outer end adapted to have sliding contact with corresponding portions of said channel, members revolubly mounted in said casing for supporting said chain-like member, and means between said revolubly mounted members for increasing or decreasing the distance therebetween.

ERNEST C. NEAL.